US00RE38262E

(19) United States

(12) Reissued Patent

Rolando et al.

(10) Patent Number: US RE38,262 E

(45) Date of Reissued Patent: Oct. 7, 2003

(54) WAREWASHING SYSTEM CONTAINING NONIONIC SURFACTANT THAT PERFORMS BOTH A CLEANING AND SHEETING FUNCTION AND A METHOD OF WAREWASHING

(75) Inventors: John J. Rolando, Woodbury, MN (US); Terry J. Klos, Victoria, MN (US)

(73) Assignee: Ecolab Inc., St. Paul, MN (US)

(21) Appl. No.: 09/798,248

(22) Filed: Mar. 2, 2001

Related U.S. Patent Documents

Reissue of:

(64) Patent No.: 5,876,514
Issued: Mar. 2, 1999
Appl. No.: 08/785,411
Filed: Jan. 23, 1997

(51) Int. Cl.[7] ..... C11D 1/72; C11D 1/722; C11D 3/10; C11D 17/00

(52) U.S. Cl. ..... 134/25.2; 134/26; 134/34; 134/40; 134/42; 510/218; 510/219; 510/220; 510/221; 510/222; 510/223; 510/224; 510/225; 510/226; 510/227; 510/228; 510/229; 510/230; 510/231; 510/232; 510/233; 510/234; 510/445; 510/446; 510/514

(58) Field of Search ..... 134/25.2, 26, 34, 134/40, 42; 510/218–234, 445, 446, 514

(56) References Cited

U.S. PATENT DOCUMENTS

| | | | | | |
|---|---|---|---|---|---|
| 3,048,548 | A | * | 8/1962 | Martin et al. | 252/135 |
| 3,166,513 | A | * | 1/1965 | Mizuno et al. | 252/99 |
| 3,334,147 | A | * | 8/1967 | Brunelle et al. | 260/611 |
| 3,356,612 | A | * | 12/1967 | Guthrie | 510/233 |
| 3,382,176 | A | * | 5/1968 | Jakobi et al. | 510/514 |
| 3,382,178 | A | * | 5/1968 | Lissant et al. | 510/219 |
| 3,408,300 | A | * | 10/1968 | Schlussler et al. | 510/219 |
| 3,444,242 | A | * | 5/1969 | Rue et al. | 260/611 |
| 3,535,258 | A | * | 10/1970 | Sabatelli et al. | 252/105 |
| 3,549,539 | A | * | 12/1970 | Mallows | 510/232 |
| 3,549,543 | A | * | 12/1970 | Kristahler et al. | 510/514 |
| 3,579,455 | A | * | 5/1971 | Sabatelli et al. | 252/135 |
| 3,700,599 | A | * | 10/1972 | Mizuno et al. | 252/99 |
| 3,817,869 | A | * | 6/1974 | Ries et al. | 510/220 |
| 3,971,726 | A | * | 7/1976 | Smith, Jr. et al. | 252/132 |
| 4,051,054 | A | * | 9/1977 | Davies et al. | 252/89 |
| 4,123,375 | A | * | 10/1978 | Altenschopfer et al. | 510/229 |
| 4,187,190 | A | * | 2/1980 | McLaughlin et al. | 510/233 |
| 4,193,886 | A | * | 3/1980 | Schoenholz et al. | 252/90 |
| 4,233,171 | A | * | 11/1980 | McLaughlin et al. | 252/99 |
| 4,264,464 | A | * | 4/1981 | Gangwisch et al. | 252/91 |
| 4,272,394 | A | * | 6/1981 | Kaneko | 510/231 |
| 4,304,680 | A | * | 12/1981 | Wixon | 252/114 |
| 4,306,987 | A | * | 12/1981 | Kaneko | 510/231 |
| 4,406,808 | A | * | 9/1983 | Gangwisch et al. | 252/91 |
| 4,411,810 | A | * | 10/1983 | Dutton et al. | 510/231 |
| 4,510,067 | A | * | 4/1985 | Ozmeral | 510/422 |
| 4,569,780 | A | * | 2/1986 | Fernholz et al. | 252/90 |
| 4,569,781 | A | * | 2/1986 | Fernholz et al. | 252/92 |
| 4,594,175 | A | * | 6/1986 | Copeland | 252/99 |
| 4,595,520 | A | * | 6/1986 | Heile et al. | 252/160 |
| 4,666,740 | A | * | 5/1987 | Wixon | 427/214 |
| 4,681,914 | A | * | 7/1987 | Olson et al. | 252/91 |
| 4,687,121 | A | * | 8/1987 | Copeland, James L. | 222/64 |
| 4,690,305 | A | * | 9/1987 | Copeland | 222/52 |
| 4,692,260 | A | * | 9/1987 | Sung et al. | 252/99 |
| 4,711,738 | A | * | 12/1987 | Copeland | 252/95 |
| 4,725,376 | A | * | 2/1988 | Copeland | 252/90 |
| 4,753,755 | A | * | 6/1988 | Gansser | 252/527 |
| 4,780,234 | A | * | 10/1988 | Malik et al. | 252/135 |
| 4,793,942 | A | * | 12/1988 | Lokkesmoe et al. | 252/99 |
| 4,818,424 | A | * | 4/1989 | Evans et al. | 252/91 |
| 4,820,440 | A | * | 4/1989 | Hemm et al. | 252/135 |
| 4,826,661 | A | * | 5/1989 | Copeland et al. | 422/106 |
| 4,846,989 | A | * | 7/1989 | Killa | 252/99 |
| 4,846,993 | A | * | 7/1989 | Lentsch et al. | 252/95 |
| 4,853,259 | A | * | 8/1989 | Taha | 427/221 |
| 4,861,518 | A | * | 8/1989 | Morganson et al. | 252/548 |
| 4,908,159 | A | * | 3/1990 | Davies et al. | 252/559 |
| 4,919,845 | A | * | 4/1990 | Vogt et al. | 252/526 |
| 4,933,102 | A | * | 6/1990 | Olson | 252/174 |
| 4,938,893 | A | * | 7/1990 | Copeland et al. | 252/527 |
| 4,971,714 | A | * | 11/1990 | Lokkesmoe et al. | 252/95 |
| 4,999,124 | A | * | 3/1991 | Copeland | 252/90 |
| 5,080,819 | A | * | 1/1992 | Morganson et al. | 252/90 |
| 5,186,912 | A | * | 2/1993 | Steindorf et al. | 422/263 |
| 5,198,145 | A | * | 3/1993 | Lobunez et al. | 252/174.14 |
| 5,198,198 | A | * | 3/1993 | Gladfelter et al. | 422/264 |
| 5,205,954 | A | * | 4/1993 | Ahmed et al. | 252/99 |
| 5,234,615 | A | * | 8/1993 | Gladfelter et al. | 252/90 |
| 5,234,719 | A | * | 8/1993 | Richter et al. | 427/384 |

(List continued on next page.)

FOREIGN PATENT DOCUMENTS

| | | | |
|---|---|---|---|
| EP | 0 182 461 | * | 9/1985 |
| WO | WO 94/24256 | * | 10/1994 |
| WO | WO 96/08553 | * | 3/1996 |

OTHER PUBLICATIONS

Dr. John L. Wilson et al., "Rinse Additives for Machine Dishwashing", *Soap and Chemical Specialties,* vol. 170171, pp. 48–52 (Feb. 1958).*

"Rinse Additives for Machine Dishwashing", Dr. John L. Wilson et al., *Soap and Chemical Specialties*, Feb. 1958, pp. 48–52, 170–171.*

*Primary Examiner*—Yogendra N. Gupta
*Assistant Examiner*—Brian P. Mruk
(74) *Attorney, Agent, or Firm*—Merchant & Gould P.C.

(57) ABSTRACT

We have found an alkaline warewashing detergent composition that can contain a critical amount of a nonionic rinse agent that when used in automatic warewashing machines permits the use of a potable water rinse without the addition of a separate rinse agent. Sufficient residual nonionic surfactant from the alkaline detergent remains on the surface ware and internal machine and rack surfaces after washing to promote adequate sheeting in the rinse cycle. The residual nonionic surfactant on internal surfaces dissolves in the rinse water to create an effective aqueous rinse agent. The nonionic rinse agents can be a single nonionic for both foam reduction cleaning and sheeting or can be a blend of nonionic materials providing these functions. The detergent can be in the form of a particulate, pelletized or block solid. The detergent can be used in a variety of high temperature and low temperature automatic warewashing machines including large multizone conveyor machines, or relatively small institutional machines that have a single washing chamber.

44 Claims, No Drawings

U.S. PATENT DOCUMENTS 5,244,468 A * 9/1993 Harris et al. ..... 8/137
5,250,230 A * 10/1993 Steele et al. ..... 252/544
5,252,244 A * 10/1993 Beaujean et al. ..... 252/120
5,268,119 A * 12/1993 Simpson et al. ..... 252/95
5,273,677 A * 12/1993 Arif ..... 252/174.21
5,302,310 A * 4/1994 Houghton ..... 252/95
5,316,688 A * 5/1994 Gladfelter et al. ..... 252/90
5,320,115 A * 6/1994 Kenna ..... 128/898
5,320,118 A * 6/1994 Fernholz ..... 134/93
5,340,501 A 8/1994 Steindorf ..... 252/546
5,358,653 A 10/1994 Gladfelter et al. ..... 252/90
5,358,655 A 10/1994 Kruse et al. ..... 252/95
5,384,060 A 1/1995 Mandy et al. ..... 252/92
5,384,364 A 1/1995 Besse et al. ..... 252/90
5,447,648 A 9/1995 Steindorf ..... 252/90
5,474,698 A 12/1995 Rolando et al. ..... 510/445
5,501,815 A 3/1996 Man ..... 252/174.17
5,516,452 A 5/1996 Welch et al. ..... 510/514
5,518,648 A 5/1996 Welch et al. ..... 510/220
5,589,099 A 12/1996 Baum ..... 510/514
5,612,305 A 3/1997 Lewis ..... 510/220
5,674,831 A 10/1997 Schulz et al. ..... 510/501
5,679,629 A 10/1997 Kubota et al. ..... 510/197
5,698,513 A 12/1997 Schulz et al. ..... 510/501
5,707,956 A 1/1998 Schmid et al. ..... 510/422
5,759,987 A 6/1998 Haerer et al. ..... 510/514

* cited by examiner

WAREWASHING SYSTEM CONTAINING NONIONIC SURFACTANT THAT PERFORMS BOTH A CLEANING AND SHEETING FUNCTION AND A METHOD OF WAREWASHING

Matter enclosed in heavy brackets [ ] appears in the original patent but forms no part of this reissue specification; matter printed in italics indicates the additions made by reissue.

FIELD OF THE INVENTION

The invention relates to an institutional or industrial warewashing detergent and to its use in automatic warewashing machines that operates with a wash and a rinse cycle. The detergent of the invention promotes soil removal and rinsing or rinse water sheeting in washing and rinsing stages, respectively. The detergent can include a cleansing source of alkalinity, a rinsing source of nonionic and can contain additional ingredients such as surfactants, rinse agents, builders, hardness sequestering agents, etc.

BACKGROUND OF THE INVENTION

A variety of warewashing detergents have been in common use in wash water solution at high temperature (temperature sanitizing) or low temperature (chemical sanitizing) for many years in both institutional and household automatic warewashing machines. Such detergents have taken the form of a thickened liquid, particulate solid, a pellet, aqueous solution or dispersion or in the form of a solid block detergent. In institutional warewashing, such particulate, pellet or solid block detergents are dispensed using an automatic dispenser that creates an aqueous concentrate (i.e.) an aqueous solution or suspension of the alkaline detergent using a water spray. The water spray dissolves a portion of the detergent when needed to for the aqueous concentrate. The aqueous concentrate is directed into a washing chamber in the automatic warewashing machine for a wash cycle. Such detergents have been based on a variety of sources of alkalinity including alkali metal hydroxide, alkali metal silicate, alkali metal carbonate or bicarbonate, etc.

During the wash cycle, the organic or inorganic components of the aqueous warewashing detergent effectively remove soil from ware. Detergent additives provide other functionality to the detergent such as water treatment, defoaming, etc. After cleaning with the detergent, the ware is commonly rinsed using an aqueous rinse composition made through the intentional combination of a rinse agent and an aqueous diluent. An aqueous rinse composition typically comprises a major proportion of water and about 50 to 400 parts of an active rinse agent per million parts of the rinse water. Rinse agents are commonly nonionic surfactants that adjust the surface energy of the ware with respect to the water to promote sheeting and complete rinse water removal. Ware free of rinse water can then dry without spotting or streaking. In typical detergent processing, the use of a water rinse without a rinse agent typically produces ware having substantial streaking and spotting caused by aqueous residue derived from the rinse remaining on the dishes after the rinse cycle ends.

In an institutional automatic warewashing machine, rinse agents and alkaline detergents are intentionally added separately using dispensers designed for either a specific rinse agent or a detergent. As set forth below, rinse agents are primarily nonionic surfactant material. Rinse agents are typically a subset of the alkylene oxide polymeric nonionic materials and have unique properties that promote sheeting action in rinse water to avoid spotting and streaking. Not all nonionic materials are appropriate for rinsing use. Rinse agents should change the energy at the interface between the washed ware and the rinse water such that the rinse water is removed completely from the surface of the ware. Such as interface energy must be reduced to prevent the adhesion of water droplets to the washed ware surface. Further, rinse agents should be low foaming to prevent machine pump cavitation caused by high levels of foam.

Automatic warewashing machines used in a variety of institutional and industrial locations come in a large variety of embodiments. The simplest machines are typically machines operating at low temperature (less than 160° F.) having a single tank for aqueous materials used in the wash cycle. Such low temperature machines typically use a washing cycle that uses a washing solution prepared from an alkaline detergent composition. Once the short washing cycle is complete, the washing liquid is typically dumped from the machine and the ware is rinsed using a rinse cycle. The rinse water is typically maintained in the machine for reuse in the next wash cycle. To create a proper wash water material, additional detergent is typically dispensed into the water to restore the appropriate concentration of the washing ingredient components. After the wash to washing and rinsing cycles are complete, the ware can be contacted with the sanitizer material to ensure complete safety. Larger multistation high temperature machines (greater than about 160° C.) are also used in locations having a higher volume of ware cleaning. Such machines typically involve a conveyor system in which individual racks of ware are moved through the multistation machine for a complete washing regimen. Often such ware racks are prescrubbed to remove large gross soils in a prewasher/prescrape stage, the ware is contacted with water under pressure to remove all large food items prior to washing. In the large rack conveyor systems, the ware and rack are typically exposed to a prewash stage, a power wash stage, a power rinse stage, a final rinse stage and can be exposed to a blow dryer to complete the production of a clean dry dish. Prewash stage is often involved contacting the ware with aqueous streams containing moderate amounts of cleaner materials to clean or prepare soils for removal. In a power wash stage, the ware is contacted with aqueous detergents containing effective concentrations of alkaline materials, surfactants and other components to completely remove the soils and prepare for the power wash stage in the prewash stage. The ware is then often directed to a power rinse stage and a final rinse stage. In these rinse stages, the alkaline detergent materials are rinsed from the dishes and if necessary, the ware can be exposed to a sanitizer rinse. In order to ensure that no confusion results from the discussion of the warewashing machines, simple dump and fill, single zone dishwashers can be operated at both high and low temperature. Similarly, large conveyor systems can also be operated at high or low temperature. These warewashing machines can also have a variety of other elements including conveyor units, drive units, storage locations, waste system disposals, racks, etc. Further, the reuse or recycling of rinse water is also common in both high and low temperature machines. The relatively clean rinse water that remains after rinsing is complete is often recycled to a wash tank for the purpose of creating a wash solution using an alkaline concentrate containing the wash chemicals.

Rinse agents used in machine rinse cycles have a polymer composition that is optimized to provide rinsing properties that have relatively reduced surfactancy, soil removing properties or other properties common to nonionic materials in general. A conventional rinse agent is typically formulated as a concentrate in liquid or solid form which is diluted with water in a rinse aid dispenser to form an aqueous rinse composition used in a warewashing machine rinse cycle to ensure that dishes sheet cleanly. The requirement for a separate rinse dispenser adds additional expense and complexity to institutional warewashing machines. This is particularly true in smaller low temperature machines having a single station that is used for all cycles in a warewashing regimen. In the low temperature machine, a rinse cycle follows a wash cycle and the rinse water is typically retained, combined with detergent and used in the washing cycle. After the washing cycle is complete the water is then directed to a machine drain. Low temperature machines are typically used in relatively small volume warewashing locations. Such locations require relatively simple operating machines with minimal moving parts and minimal upkeep and maintenance. Larger installations, having conveyor type machines that clean a large volume of ware, often on a 24 hour a day basis, also have a need for an easily used warewashing machine and warewashing chemicals. Accordingly a need has existed in this art to reduce the amount of chemicals stored and used in warewashing locations using either a relatively simple low temp machine or a relatively complex high temp conveyor-type machine.

BRIEF DISCUSSION OF THE INVENTION

We have found that institutional or industrial warewashing detergents adapted for use in automatic warewashing machines can be formulated with a critical amount of a rinse agent composition in the warewashing formulation, to provide sheeting and rinsing in a subsequent potable water rinse cycle. In this rinse cycle nonionic rinse agents are intentionally omitted from the aqueous rinse composition. Residual nonionic surfactants left on the ware, rack and machine surfaces dissolve in the rinse water to promote rinse sheeting. This detergent is adapted primarily for use in a machine that uses no separate rinse aid or dispenser. However, the detergent can be used with a typical aqueous rinse composition. Surprisingly, we have found that above the critical concentration of rinse agent in the warewashing detergent, a sufficient quantity of rinse agent material to cause rinse sheeting carries over on the wet dishes, rack and on the machine internal working parts, after the cleaning cycle is complete. The residual rinse aid can promote adequate sheeting in the potable water rinse cycle to substantially remove rinse water from the dishes leaving the dishes substantially spot-free. The potable water rinse is typically formulated with no intentionally added rinse agent. The use of such a detergent rinse agent combination permits operators to avoid the complexity or expense of both a separate rinse agent dispenser and purchasing rinse agent, if desired. The resulting operations are surprisingly efficient, produce clean, spot and streak-free dishes and can reduce both personnel and materials costs. In addition, the high surfactant level in the wash cycle enhances the removal of greasy soils which in turn creates a surface which is easier to rinse sheet and dry free of films and spots.

Typical useful rinse agents are the poly (lower alkylene oxide) polymers that are usually prepared by the condensation of lower (2–4 carbon atoms) alkylene oxide monomer (s) that have rinsing or sheeting activity. For example, ethylene oxide or propylene oxide (with enough ethylene oxide to make a water soluble or dispersible product), can be condensed with a compound having a hydrophobic hydrocarbon chain and containing one or more active hydrogen atoms such as a higher alkyl phenol, higher fatty acids, higher fatty amines, higher fatty polyols and alcohols and in some cases higher fatty mercaptans. Such compounds include fatty alcohols having 8–20 carbon atoms in an alkyl or aliphatic chain, an alkoxylate (preferably ethoxylate) with an average of about 1 to 100, preferably 5 to 20 with 2 to 25, 5 to 20 lower alkylene oxide moieties. Preferred nonionic materials are those represented by the formula:

$$RO(C_2H_4O)_n—H$$

wherein R is the aliphatic or alkyl saturated residue having 5 to 100 carbon atoms and n is a number from 5 to 25.

The aqueous cleaning composition comprising a major proportion of an aqueous diluent and about 250 to 3000 and typically 800 to 1800 parts by weight of an alkaline warewashing detergent per each one million parts of the aqueous diluent. The detergent includes about 0.1 to 60 wt-% of a source of alkalinity, and at least about 30 wt-% of nonionic surfactant having at least one block segment comprising $-(AO)_x-$ where AO represents an oxyalkylene moiety and x is a number of about 1 to 100.

Morganson et al., U.S. Pat. No. 5,080,819 and Gansser, U.S. Pat. No. 4,753,755, teach an alkaline solid block detergent containing a small, but effective amount of a nonionic surfactant to aid in soil removal at typical warewashing temperatures. Morganson et al. teach that aqueous washing solutions containing alkaline materials such as carbonates, silicates, etc. often fail to clean completely at low temperatures. The nonionic surfactant in these systems provide extra soil removal properties. Gansser, U.S. Pat. No. 4,753,755 teaches broadly a warewashing detergent having from 10–90 wt % of a nonionic material. Neither Gansser nor Morganson et al. indicate that a rinse agent nonionic can be added to a low alkaline cast solid to act as a rinse agent nor does Gansser or Morganson et al. teach any particular utility for such a rinse aid material in a solid detergent. Nonionic materials adapted for detergent purposes are typically different than rinse agent materials.

Conventional alkaline detergents are disclosed in Fernholz et al., U.S. Pat. Nos. 4,569,780 and 4,569,781; Heile et al., U.S. Pat. Nos. 4,595,520 and 4,680,134; Olson et al., U.S. Pat. No. 4,681,914; Gansser, U.S. Pat. No. 4,753,755; Copeland, U.S. Pat. No. 4,725,376; Lokkesmoe et al., U.S. Pat. No. 4,793,942; Killa, U.S. Pat. No. 4,846,989; Lentsch et al., U.S. Pat. No. 4,861,518; Morganson et al., U.S. Pat. No. 5,080,819; and Gladfelter et al., U.S. Pat. No. 5,316,688.

Conventional rinse agents are disclosed in Copeland, U.S. Pat. No. 4,594,175; Morganson et al., U.S. Pat. No. 4,624,713; Copeland, U.S. Pat. No. 4,711,738; Gladfelter et al., U.S. Pat. No. 5,358,653; Steindorf, U.S. Pat. No. 5,447,648; Copeland et al., U.S. Pat. No. 4,938,893; and also see Mizuno et al., U.S. Pat. No. 3,166,513; Sabatelli et al., U.S. Pat. No. 3,535,258; Sabatelli et al., U.S. Pat. No. 3,579,455; Mizuno et al., U.S. Pat. No. 3,700,599 and Copeland et al., U.S. Pat. No. 3,899,436. Dispensers for creating an aqueous rinse by combining diluent water with a rinse agent are shown in (e.g.) Fernholz, U.S. Pat. No. 5,320,118; Copeland, U.S. Pat. No. 4,690,305; Copeland, U.S. Pat. No. 4,687,121; Copeland et al., U.S. Pat. No. 4,826,661; and Copeland, U.S. Pat. No. 4,999,124.

DETAILED DISCUSSION OF THE INVENTION

In the novel method of the invention, ware is cleaned at a cleaning station in an automatic warewashing machine using an warewashing detergent containing at least about 20% by weight of a combination of detergent and rinse agent. The alkaline detergent materials of the invention can contain about 20 to 40 wt %, preferably about 25 to 30 wt % of the rinse agent composition of the invention. This amount of rinse agent ensures that the detergent composition contains sufficient source of alkalinity and other components to adequately clean the dishes while leaving a sufficient concentration of a rinse agent residue on the layer and the internal structures of the machine including rack and ware, spray arms, walls, etc. to promote rinsing or sheeting in the potable water rinse cycle. At the end of the wash cycle, the ware and the washing machine interior have an aqueous residue derived from the aqueous washing solution made from the detergent. The aqueous residue contains sufficient rinse agent to ensure completely or substantially complete rinsing in a potable water rinse cycle free of intentionally added rinse agent. The resulting dishes are clean and substantially free of the spotting or streaking of alkaline residue which is typically a result of poor rinsing or sheeting action. In the method of the invention no rinse agent is intentionally added to the rinse water to form an aqueous rinsing composition. All sheeting action arises from the nonionic surfactant carryover from the washing cycle.

Rinse Agent

Rinse agents comprise nonionic materials which carry no discrete charge when dissolved or suspended in aqueous media. The hydrophilicity in a rinse agent is provided by hydrogen bonding with water molecules. Oxygen atoms and hydroxyl groups readily form strong hydrogen bonds. Such hydrogen bonding can provided a dispersion or solubilization of the material in neutral or alkaline media. Rinse agent active materials fall within a number of well understood molecular classes including polyoxyethylene(ethoxylate) surfactants, carboxylic acid ester surfactants, carboxylic acid amide surfactants, hydrophobically substituted oxyalkylene surfactants and polyalkylene oxide block copolymers. All nonionic rinse agents typically have at least one block segment comprising $-(AO)_x-$, wherein AO represents an oxyalkylene moiety and x is a number of about 1 to about 100. Preferably, AO represents either an ethylene oxide moiety or a propylene oxide moiety. A homopolymer polyethylene oxide or a homopolymer polypropylene oxide have little or no surfactant properties. The $-(AO)_x-$ block must be attached to a functional group differing in hydrophilicity (or hydrophobicity) to obtain rinsing or sheeting properties. A number of polyethoxy substituted surfactants are known including ethoxylated aliphatic alcohols, ethoxylated alkyl phenols, ethoxylated carboxylic acid and carboxylic acid esters, ethoxylated fatty acid amides and others. Such surfactants can be manufactured in a low foaming rinse agent active form. The preferred rinse agent for the purposes of this invention comprises a polyalkylene oxide block copolymer. Such copolymers are derive from higher alkylene oxides, such as ethylene oxide, propylene oxide, butylene oxide, styrene oxide, etc. Such block copolymers typically contain a polyethylene oxide block which is relatively hydrophilic combined with another polyalkylene oxide block which is typically hydrophobic resulting in surfactant properties. Preferred surfactants include those surfactants that can remove proteinaceous and greasy soil in combination with rinsing capability. Preferred surfactants are low foaming surfactants that obtain grease removal and rinse aid properties.

Certain types of polyoxypropylene-polyoxyethylene block copolymer surfactants have been found to be particularly useful. Those surfactants comprising a center block of polyoxypropylene units (PO), and having a block of polyoxyethylene (EO) units to each side of the center PO block, are generally useful in the context of this invention, particularly where the average molecular weight ranges from about 900 to 14,000, and the percent of weight EO ranges from about 10 to 80. These types of surfactants are sold commercially as "Pluronics" by the BASF Wyandotte Corporation, and are available under other trademarks from other chemical suppliers.

Also useful in the context of this invention are surfactants having a center block of polyoxyethylene units, with end blocks of polyoxypropylene units. These types of surfactants are known as "Reverse Pluronics", also available from Wyandotte.

In addition, hydrophobically modified pluronic and reverse pluronic surfactants can be employed; where, a modifying group (R) such as a methyl ethyl propyl butyl benzyl, etc. may be capping the terminal oxy alkaline group; e.g., $R-(EO)_n-(PO)_m-(EO)_n-R$.

Alcohol and alkyl aryl ethoxylates having EO and PO blocks can also be useful in the context of this invention. Straight chain primarily aliphatic alcohol ethoxylates can be particularly useful since the stereo chemistry of these compounds can permit occlusion by urea, and they can provide effective sheeting action. Such ethoxylates are available from several sources, including BASF Wyandotte where they are known as "Plurafac" surfactants. A particular group of alcohol ethoxylates found to be useful are those having the general formula $R-(EO)_m-(PO)_n$, where m is an integer around 5, e.g. 2–7, and n is an integer around 13, e.g. 10–16. R can be any suitable radical, such as a straight chain alkyl group having from about 8 to 18 carbon atoms. Additionally, hydrophobically modified alcohol ethoxylates alkyl aryl alkyl ethoxylates and alkyl-aryl-ethoxylates are described in the current work; for example, $R-(EO)_m-R'$ where R' is a $C_{1-10}$ alkyl or benzyl and R is a $C_{8-18}$ alkyl; and R"-aryl wherein R" is a $C_{8-12}$ alkyl.

Nonionic compounds useful in the invention include; alcohol ethoxylates comprising the formula segment:

$$C_{6-24}\text{Alkyl-O-}(EO)_x-$$

where EO is an oxyethylene moiety and x is 1–100; benzyl capped alcohol ethoxylates comprising the formula:

$$C_{6-24}\text{Alkyl-O-}(EO)_x\text{-Bz}$$

where EO is an oxyethylene moiety. Bz is benzyl and x is 1–100 and preferably 2–25; nonionic block polymeric surfactants having the formula:

$$HO-(PO)_y-(EO)_x-(PO)_y-H$$

where PO is oxypropylene, EO is oxyethylene, x and y are independently 1–100; and nonionic block polymeric surfactants having the formula:

$$HO-(PO)_y-(EO)_x-(PO)_z-(EO)_x-(PO)_y-H$$

where PO is oxypropylene, EO is oxyethylene and x, y and z are independently about 1–100, preferably the (PO)z moiety comprises a heteric block comprising a propylene glycol residue, about 1–5 moles EO and about 20–30 moles PO.

Another compound found to be useful is a surfactant having the formula:

$$R-\overset{\overset{\displaystyle O}{\|}}{C}-O-(EO)_m(PO)_m(EO)_m(PO)_m$$

wherein m is independently an integer from about 18–22, preferably 20, and the surfactant has a molecular weight of from about 2,000 to 3,000, preferably about 2,500, a percent EO of about 36 to 44, preferably about 40, and where R is a straight chain alkyl group having from about 8 to 18 carbon atoms. One of the preferred materials is a block copolymer of the structure $$(PO)_n(EO)_n(EOPO)_n(PO)_m(EOPO)_m(EO)n(PO)_m$$

where m is independently an integer from 1–3 and at each occurrence of n, independently, n is an integer from 17–27, and EOPO represents a random or heteric mixture of EO and PO units at a ratio of EO to PO of from about 6:100 to 9:100. Most preferably, the copolymer will be of the structure $$(PO)_{23}(EO)_{26}(EOPO)_{20}(PO)_1(EOPO)_{20}(EO)_{26}(PO)_{23}$$

where EOPO represents a random or heteric mixture of EO and PO units are a ratio of EO to PO of about 7:93. The preferred compound has an average molecular weight of between about 3,500–5,500, preferably about 4,500, and a weight percent of EO of about 25–35%, preferably about 30%.

Another preferred material comprises a surfactant having the formula $$R-\overset{\overset{\displaystyle O}{\|}}{C}-O-(EO)_m(PO)_m(EO)_m(PO)_m$$

wherein m is an integer from about 18–22, preferably 20, and the surfactant has a molecular weight of from about 2,000 to 3,000, preferably about 2,500, a percent EO of about 36 to 44, preferably about 40, and where R is a straight chain alkyl group having from about 8 to 18 carbon atoms. More preferably, the components will be present in amounts of from 45 to 50%, 2 to 4%, and 45 to 50%, respectively.

Source of Alkalinity

In order to provide an alkaline pH, the composition comprises an alkalinity source. Generally, the alkalinity source raises the pH of the composition to at least 10.0 in a 1 wt % aqueous solution and generally to a range of from about 10.0 to 14, preferably from about 10.5 to 13, and most preferably from about 11.0 to 12.5.

This higher pH increases the efficacy of the soil removal and sediment breakdown when the chemical is placed in use and further facilitates the rapid dispersions of soils. The general character of the alkalinity source is limited only to those chemical compositions which have a greater solubility. That is, the alkalinity source should not contribute metal ions which promote the formation of precipitates or film salts. Exemplary alkalinity sources are alkali metal carbonate and bicarbonate compositions. The major source of inorganic alkalinity and inorganic detergency resides with the sodium or potassium carbonate or bicarbonate detergent materials. These materials are preferred because they have sufficient detergency to clean ware in the warewashing machines but also are easily rinsed. We have found that in certain instances detergents containing a major proportion of sodium hydroxide, sodium silicate or other stronger alkaline detergents can be rinse resistant. However, even in compositions of the invention based on sodium or potassium carbonate materials, the compositions can contain some small amount of sodium hydroxide for pH adjustment, some small proportion of a silicate composition for aluminum protection or other source of alkalinity. Such source of alkalinity is present in the composition at a concentration of about 0.1 to 35 wt % based on the particulate or solid block composition. The alkali metal carbonates which may be used in the invention include sodium carbonate, potassium carbonate, sodium or potassium bicarbonate or sodium or potassium bicarbonate, among others. The preferred alkalinity source for this invention is sodium carbonate also known as soda ash. Carbonates used in this invention are used in the composition of the invention at a proportion of about 25 to 50 wt % and more preferably about 25 to 40 wt %.

In order to treat or soften water and to prevent the formation of precipitates or other salts, the composition of the present invention generally comprises builders, chelating agents or sequestrants.

A builder is typically a material that enhances or maintains the cleaning efficiency of a detergent composition. Several types of compounds with different performance capabilities are used. Builders have a number of functions, principally inactivation of water hardness accomplished by sequestration or by ion exchange. Complex phosphates are common sequestrant builders. Sodium aluminum silicate is an ion exchange builder. Another function of builders are to supply alkalinity to a detergent formulation, especially for cleaning acid soils, to provide buffering to maintain alkalinity at an effective level to aid in keeping removed soil from redepositing during washing into emulsified oil and greasy soils. Detergent builders are well understood materials, commonly available for use in these aqueous warewashing detergents.

Generally, sequestrants are those molecules capable of coordinating the metal ions commonly found in service water and thereby preventing the metal ions from interfering with the functioning of detersive components within the composition. The number of covalent bonds capable of being formed by a sequestrant upon a single hardness ion is reflected by labeling the sequestrant as bidentate (2), tridentate (3), tetradentate (4), etc. Any number of sequestrants may be used in accordance with the invention. Representative sequestrants include salts of amino carboxylic acids, phosphonic acid salts, water soluble acrylic polymers, among others.

Suitable amino carboxylic acid chelating agents include N-hydroxyethyliminodiacetic acid, nitrilotriacetic acid (NTA), ethylenediaminetetraacetic acid (EDTA), N-hydroxyethyl-ethylenediaminetriacetic acid (HEDTA), and dimethylenetriaminepentaacetic acid (DTPA). When used, these amino carboxylic acids are generally present in concentrations ranging from about 1 wt % to 25 wt %, preferably from about 5 wt % to 20 wt %, and most preferably from about 10 wt % to 15 wt %.

Other suitable sequestrants include water soluble acrylic polymers used to condition the wash solutions under end use conditions. Such polymers include polyacrylic acid, polymethacrylic acid, acrylic acid-methacrylic acid copolymers, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, or mixtures thereof. Water soluble salts or partial salts of these polymers such as their respective alkali metal (for example, sodium or potassium) or ammonium salts can also be used.

The weight average molecular weight (Mw) of the polymers is from about 4000 to about 12,000. Preferred polymers include polyacrylic acid, the partial sodium salts of polyacrylic acid or sodium polyacrylate having an average molecular weight within the range of 4000 to 8000. These acrylic polymers are generally useful in concentrations ranging from about 0.5 wt % to 20 wt %, preferably from about 1 to 10, and most preferably from about 1 to 5.

Also useful as sequestrants phosphonate compositions such as phosphonic acids and phosphonic acid salts. Such useful phosphonic acids include, mono, di, tri and tetraphosphonic acids which can also contain groups capable of forming anions under alkaline conditions such as carboxy, hydroxy, thio and the like. Among these are phosphonic acids having the formula $$R_1N[C_2PO_3H_2]_2$$

or $$R_2C(PO_3H_2)_2OH$$

wherein $R_1$ may be -[(lower)alkylene]N[$CH_2$-$PO_3H_2$]$_2$ or a third ($C_2PO_3H_2$) moiety; and wherein $R_1$ is selected from the group consisting of $C_1$–$C_6$ alkyl.

The phosphonic acid may also comprise a low molecular weight phosphonopolycarboxylic acid such as one having about 2–4 carboxylic acid moieties and about 1–3 phosphonic acid groups. Such acids include 1-phosphono-1-methylsuccinic acid, phosphonosuccinic acid and 2-phosphonobutane-1,2,4-tricarboxylic acid.

When used as a sequestrant in the invention, phosphonic acids or salts are present in a concentration ranging from about 0.25 wt % to 15 wt %, preferably from about 1 to 10, and most preferably from about 1 to 5.

The invention can also comprise a solidifying agent when used in solid block product format. Generally, any agent or combination of agents which provides a requisite degree of solidification and aqueous solubility may be used with the invention. A solidification agent may be selected from any organic or inorganic compound which imparts a solid character and/or controls the soluble character of the present composition when placed in an aqueous environment. The solidifying agent may provide for controlled dispensing by using solidification agents which have a relative aqueous solubility. For systems which require less aqueous solubility or a slower rate of dissolution an organic nonionic or amide hardening agent may be appropriate. For a higher degree of aqueous solubility, an inorganic solidification agent or a more soluble organic agent such as urea can be used.

Compositions which may be used with the present invention to vary hardness and solubility include amides such as stearic monoethanolamide, lauric diethanolamide, and stearic diethanolamide.

Normally solid polyalkylene oxide polymers and related nonionic surfactants have also been found to impart varying degrees of hardness and solubility. Nonionics useful in this invention include normally solid nonylphenol ethoxylates, linear alkyl alcohol ethoxylates, ethylene oxide/propylene oxide block copolymers.

Nonionic compositions are listed at length in McCutchins, Detergents and Emulsifiers, 1973 Annual and in Surface Active Agents, Vol. 2, by Schwartz, Perry and Burch, Interscience Publishers, 1958 and in Kirk-Othmer Concise Encyclopedia of Chemical Technology, 1985 at pp. 1143–1144.

Particularly desirable as hardeners are those which are solid at room temperature and have an inherently reduced aqueous solubility as a result of the combination with the coupling agent.

Other surfactants which may be used as solidifying agents include anionic surfactants which have high melting points to provide a solid at the temperature of application. Anionic surfactants which have been found most useful include linear alkyl benzene sulfonate surfactants, alcohol sulfates, alcohol ether sulfates, and alpha olefin sulfonates. Generally, linear alkyl benzene sulfonates are preferred for reasons of cost and efficiency. Amphoteric or zwitterionic surfactants are also useful in providing detergency, emulsification, wetting and conditioning properties. Representative amphoteric surfactants include N-coco-3-aminopropionic acid and acid salts, N-tallow-3-iminodiproprionate salts. As well as N-lauryl-3-iminodiproprionate disodium salt, N-carboxymethyl-N-cocoalkyl-N-dimethylammonium hydroxide, N-carboxymethyl-N-dimethyl-N-(9-octadecenyl)ammonium hydroxide, (1-carboxyheptadecyl) trimethylammonium hydroxide, (1-carboxyundecyl) trimethylammonium hydroxide, N-cocoamidoethyl-N-hydroxyethylglycine sodium salt, N-hydroxyethyl-N-stearamidoglycine sodium salt, N-hydroxyethyl-N-lauramido-β-alanine sodium salt, N-cocoamido-N-hydroxyethyl-β-alanine sodium salt, as well as mixed alcyclic amines, and their ethoxylated and sulfated sodium salts, 2-alkyl-1-carboxymethyl-1-hydroxyethyl-2-imidazolinium hydroxide sodium salt or free acid wherein the alkyl group may be nonyl, undecyl, or heptadecyl. Also useful are 1,1-bis(carboxymethyl)-2-undecyl-2-imidazolinium hydroxide disodium salt and oleic acid-ethylenediamine condensate, propoxylated and sulfated sodium salt. Amine oxide amphoteric surfactants are also useful. This list is by no means exclusive or limiting.

Other compositions which may be used as hardening agents with the composition of the invention include urea, also known as carbamide, and starches which have been made water soluble through an acid or alkaline treatment. Also useful are various inorganics which either impart solidifying properties to the present composition and can be processed into pressed tablets for carrying the alkaline agent. Such inorganic agents include calcium carbonate, sodium sulfate, sodium bisulfate, alkali metal phosphates, anhydrous sodium acetate and other known hydratable compounds.

Solidifying agents may be used in concentrations which promote solubility and the requisite structural integrity for the given application. Generally, the concentration of solidifying agent ranges from about 0.1 wt % to 30 wt %, preferably from about 10 wt % to 25 wt %, and most preferably from about 15 wt % to 20 wt %.

The article of this invention may also comprise any number of formulatory or application based adjuvants such as sanitizers, bleaches, colorants, fragrances, etc.

The detergent composition of the invention may also comprise a beaching source. Bleaches suitable for use in the detergent composition include any of the well known bleaching agents capable of removing stains from such substrates as dishes, flatware, pots and pans, textiles, countertops, appliances, flooring, etc. without significantly damaging the substrate. These compounds are also capable of providing disinfecting and sanitizing antimicrobial efficacy in certain applications. Preferred bleaches include encapsulated bleaches which prevent reaction between the bleach and the nonionic or other organic components. A nonlimiting list of bleaches include hypochlorites, chlorites, chlorinated phosphates, chloroisocyanates, chloroamines, etc.; and peroxide compounds such as hydrogen peroxide, perborates, percarbonates, etc.

Preferred bleaches include those encapsulated bleaches which liberate an active halogen species such as Cl·, Br·, $OCl^-$, or $OBr^-$ under conditions normally encountered in typical cleaning processes. Most preferably, the bleaching agent releases Cl· or $OCl^-$. A nonlimiting list of useful chlorine releasing bleaches includes sodium hypochlorite, calcium hypochloride, lithium hypochloride, chlorinated trisodiumphosphate, sodium dichloroisocyanurate, chlorinated trisodium phosphate, sodium dichloroisocyanurate, potassium dichloroisocyanurate, pentaisocyanurate, trichloromelamine, sulfondichloroamide, 1,3-dichloro 5,5-dimethyl hydantoin, N-chlorosuccinimide, N,N'-dichloroazodicarbonimide, N,N'-chloroacetylurea, N,N'-dichlorobiuret, trichlorocyanuric acid and hydrates thereof. Because of their higher activity and higher bleaching efficacies the most preferred bleaching agents are the alkaline metal salts of dichloroisocyanurates and the hydrates thereof. Generally, when present, the actual concentration of bleach source or agent (in wt % active) may comprise about 0.5 to 20 wt %, preferably about 1 to 10 wt %, and most preferably from about 2 to 8 wt % of the composition.

The composition of the invention may also comprise a defoaming surfactant useful in warewashing compositions. A defoamer is a chemical compound with a hydrophobe-hydrophile balance suitable for reducing the stability of protein foam. The hydrophobicity can be provided by an oleophilic portion of the molecule. For example, an aromatic alkyl or alkyl group, an oxypropylene unit or oxypropylene chain, or other oxyalkylene functional groups other than oxyethylene provide this hydrophobic character. The hydrophilicity can be provided by oxyethylene units, chains, blocks and/or ester groups. For example, organophosphate esters, salt type groups or salt forming groups all provide hydrophilicity within a defoaming agent.

Typically, defoamers are nonionic organic surface active polymers having hydrophobic groups, blocks or chains and hydrophilic ester groups, blocks, units or chains. However, anionic, cationic and amphoteric defoamers are also known. Certain phosphate esters are also suitable for use as defoaming agents. For example, esters of the formula $$RO\text{-}(PO_3M)_nR$$

wherein n is a number ranging from 1 to about 60, typically less than 10 for cyclic phosphates, M is an alkali metal and R is an organic group or M, with at least one R being an organic group such as an oxyalkylene chain. Suitable defoaming surfactants include ethylene oxide/propylene oxide blocked nonionic surfactants, fluorocarbons and alkylated phosphate esters. When present defoaming agents may be present in a concentration ranging from about 0.1 wt % to 10 wt %, preferably from about 0.5 wt % to 6 wt % and most preferably from about 1 wt % to 4 wt % of the composition.

Compositional Form and Shape

The alkaline chemical compositions used in the claimed article may take any number of forms including particulate or granular, agglomerate, compressed, extruded solid or cast solid. Granular solids may include any particle solids ranging in diameter from a few microns or millimeters in diameter to about one inch in diameter and preferably up to 0.25 inch or less. These granular solids may be formed through any variety of blending or particle forming means known to those of skill in the art.

Compressed solids include solids formed by processes such as extrusion, tableting, pelletizing and the like known to those of skill in the art. Compressed solids may range in diameter from fractions of inches or greater and preferably up to about 2 inches in diameter. Cast solids are materials which are cast by processes known to those of skill in the art. Cast solids generally comprise a single mass of chemical agent ranging in diameter from about 4 inches to 12 inches, and most preferably from about 6 inches to 8 inches, weighing about 0.25 to 10 kilograms, for reasons of economy in use.

Solids used in the invention may be homogeneous or nonhomogeneous. Homogeneous indicates that the solid mass has an even and uniform chemical and physical mixture of constituents. Nonhomogeneous indicates that the solid mass may have an uneven or nonuniform chemical or physical makeup. For example, a nonhomogeneous mass comprises a solid detergent cleaner containing a nonionic surfactant and encapsulated chlorine granules. The incompatibility of the nonionic surfactant and the chlorine generally necessitate the encapsulation of the chlorine which, when mixed in the solid, constitute granules or encapsulates of different chemical composition and physical size than the solid mass in general.

The physical form of the cast and compressed solids may take any general form that can be dispensed manually or through mechanical or electromechanical machines including block, pellet, or granule. If in block form, the invention may take any variety of shapes including cylindrical, conical, cubed or square, hexagonal and the like. The compressed or cast solid blocks may take the form of a cylinder. Generally, the cylinder may be regular in shape or irregular in shape.

Solid Block Coatings

The solid block detergents of the invention can be manufactured with a soluble coating to enhance handlability and humidity resistance. Preferably the coating stabilizes the detergent block such that the detergent can resist the effects of environmental humidity which can soften or solubilize the detergent components. At room temperature (70°–75° F.) and about 50–80% relative humidity, the coated detergent mass needs little or no water, preferably gains less than about 5 grams of water per 100 grams of detergent measured over a 30 day period. Coatings that can be used in the manufacture of the detergent articles of the invention comprise both soluble and insoluble organic materials that can form an integral coating on the surface of the detergent block. The coating typically comprises a continuous layer covering substantially the entire detergent mass having a thickness of about 0.1 to 10 millimeters. Coatings that can be used to manufacture the detergent block articles of the invention are those coatings which are chemically stable to the chemical constituents of the detergent mass and can be dissolved or dispersed in an aqueous dispenser using a water spray. Both water soluble and water insoluble components can be used to manufacture the coatings of the invention. The coatings can be introduced onto a detergent mass using conventional coating techniques such as coextrusion, spray coating, curtain coating, immersion coating, surface molding and others. A combination of processes can be used to prepare multilayer coatings for specific end uses. The coating compositions can comprise materials that are applied in the form of liquids, particulates or molten compositions. Examples of aqueous dispersions that can be used include dispersions of film forming polymers such as ethylene vinyl acetates, acrylates, ABS resins, etc. Coatings can also be applied in the form of an aqueous solution of materials, such solutions can include soluble surfactants, soluble cellulosic derivative materials, soluble salts, etc. Examples of such materials include polyethylene glycols (polyethylene oxide polymers), polyethylene oxide, polypropylene oxide, EO or PO block copolymers, polyacrylic acid, etc.

The coatings of the invention can be applied in the form of a melt coating. Such materials are commonly substantially organic compositions having a melting point greater than about 30° C., preferably between 35°–100° C. The coatings have a melt viscosity that can obtain a continuous uniform coating at about uniform coating temperatures. Such barrier coatings can include thermoplastic waxy materials including low molecular weight polyethylene waxes, petroleum waxes, paraffin waxes, microcrystalline waxes, synthetic waxes, hydrogenated animal or vegetable fats or oils, fatty acid derivatives including fatty acid amides, preferred coating materials for use in the melt coating invention include hydrogenated and non-hydrogenated coco fatty acids. Similar stearic acids, hydrogenated and non-hydrogenated fatty acid monoethanol amides, paraffin wax, polyethanol glycols having a molecular weight ranging from about 1000 to about 10,000, pluronic block copolymers and others.

The Polymeric Films

The alkaline cleaning article of the present invention can optionally also comprise a continuous polymeric film or wrapper. The films of the invention have at least three general functions or properties. First, the disclosed films remain stable even though used with highly alkaline chemical compositions. In this instance, stability means that the films will not chemically or mechanically degrade or erode over time when placed in storage even though in contact with highly alkaline solid materials. Further, the film must remain aqueous soluble or dispersible after extended contact with alkaline chemicals.

An additional function of the polymeric film of the present invention is strength. Specifically, films used in accordance with the invention must have sufficient tensile strength to allow their use in the packaging of solid block, granular, compressed or pelletized chemical agents. The polymeric films of the invention should have sufficient strength to allow storage and transport after packaging so that the alkaline chemical agent is contained within a package of adequate structural integrity.

The films of the present invention preferably provide enough tolerance to humid, temperate environments to prevent degradation of the film exposure of the highly alkaline material to packagers, transporters, or operators in the use of the chemical composition. Yet the films remain soluble or dispersible when exposed to water of the appropriate temperature.

Keeping these general functions in mind, any aqueous soluble or dispersible polymeric film may be used which provided adequate stability, strength, and aqueous tolerance in accordance with this invention. However, certain vinyl monomers, polymers, copolymers, and polymeric mixtures have been found especially preferable including vinyl alcohol polymers, polymers resulting from alpha, beta unsaturated carboxylic acid monomers, polymers resulting from alkyl or aliphatic esters of alpha, beta unsaturated carboxylic ester monomers, oxyalkylene polymers and copolymers.

Warewashing Methods of the Invention

The compositions of the invention can be preferably used in warewashing machines called "low temp" machines which are commonly relatively simple machines. The compositions of the invention are well adapted for low temp machine applications. Conventional low temp machines have additional rinse/surfactant carryover due to machine dynamics (e.g., flush cycle). In high temperature applications, the carryover comes only from residual detergent "trapped" on or coating the ware racks. In the machine a single wash station is used for all machine cycles. Such machines can obtain a prescrape step for removal of large residue, a scraping step for the removal of large and small mechanically removable debris, a washing step involving contacting the ware with an aqueous solution containing an effective concentration of the warewashing detergent at a useful temperature commonly 30°–65° C., more preferably 40°–50° C. After the washing step is complete, the ware can be rinsed with a potable water rinse. Nonionic rinse agent carryover from the washing step provides sufficient sheeting action to a potable water rinse to completely rinse the ware. After the ware is rinsed, the ware is commonly dried in a drying station or left to dry in the ambient environment. In the rinsing step, potable water is contacted with the ware at a temperature of about 30°–65° C., preferably about 40°–50° C. Any preferred low temp warewashing machine, the rinse water is recycled and used as the wash water. In such a recycled step, the rinse water is combined with the alkaline detergent and contacted with the dishes at an effective cleaning temperature. In low temperature machines, either before or after a rinse step, the dishes are often contacted with a sanitizer composition that provides antimicrobial properties not provided by the temperature of the aqueous washing material or potable water rinse. Sanitizer materials are well known in the detergent art and included compositions including sodium hypochlorite, peracetic acid, etc. Such materials are commonly manufactured in concentrate form, diluted with water or other aqueous diluent and contacted with the washed ware in the dish machine at known concentrations.

In typical high temperature machines, ware is carried on a conveyor from station to station within a machine. Such a machine can have a prescraping step, a scraping step, a washing step, a second washing step, a rinsing step and a drying step. In such a machine the rinse water can be recycled to a washing step.

In a conveyor type machine, the aqueous washing solution is held at a temperature of about 60° C. with 65° C. to 85° C. Similarly, the rinse step uses a potable water rinse at a temperature of about 85° C. to about 90° C. We have found that the concentration of the nonionic sheeting agent in the aqueous rinse commonly is about 20 to 40 parts by weight or more of the nonionic sheeting agent per million parts of the aqueous rinse. Such concentrations are achievable if the alkaline detergent material contains greater than about 25 wt % of the nonionic sheeting agent. It should be understood that other nonionic and other polyalkylene oxide materials can be present in the invention. Such materials include casting agents, detergent compositions and other materials. Such materials often add little sheeting action to the compositions.

The foregoing is a detailed description of the inventive warewashing method. The following examples and data further illustrate the invention and contain a best mode.

For the purpose of this invention, the term rinse agent relates to a concentrated organic material, having one or more active ingredients, that can be diluted with service water to form an aqueous rinse composition that is directly contacted with ware. The term aqueous rinse composition typically relates to an aqueous solution containing about 1 to 200 parts by weight of the rinse agent per million parts of the aqueous rinse that is formulated to provide sheeting in a rinse cycle. The term warewashing detergent relates to a particulate, granular, pelletized, aqueous solution or dispersion, extruded solid or solid block detergent containing a substantial proportion of a source of alkalinity and other compositions providing useful cleaning properties. The term "the aqueous rinse being substantially free of an intentionally added rinse agent" is intended to mean that the aqueous rinse does not contain an effective amount of a rinse agent intentionally added to an aqueous diluent to form the aqueous rinse. In the methods of the invention, the rinse agent is derived from the residue of the detergent left after the washing cycle is done. The term is intended to convey the concept that the rinse agent that promotes rinsing during the potable water rinse arises from the warewashing detergent and not from the addition of a rinse agent apart from that contributed by the warewashing detergent. Surprisingly, we have found that alkaline warewashing detergents containing about 30 wt % or greater of a nonionic having rinsing properties can provide cleaning in a wash cycle and adequate sheeting in a rinse cycle for both high temperature and low temperature, conveyor or dump-and-fill machines. This property is particularly useful in low temperature dump-and-fill machines which are designed to recycle used aqueous rinse water into the warewashing wash cycle. Such machines maintain a substantial concentration of the nonionic material in both the wash water and the rinse water to produce clean, spot and streak-free ware. For the purpose of this invention the term "ware" connotes tableware, silverware, dishes, cups and saucers, bowls, plates, serving pieces, pots and pans, frying pans, metal and plastic kitchen implements such as spatulas, whisks, whips and any other implement, made of metal, plastic or wood commonly used in either an institutional or household kitchen or dining room. The term "potable" aqueous rinse typically includes service water, i.e. water obtained from local municipal or state water utility companies, that is often heated to a temperature between 40° C. and about 75° C. for use in a rinse stage in a warewashing machine.

The discussion above relating to warewashing methods, and alkaline detergent compositions containing a rinse agent, relate to our current understanding of the technical aspects of the invention. The following compositional examples, testing and related data provide evidence of the effectiveness of the invention and include a best mode.

EXAMPLE 1

Into a stirred and heated mixing tank is added 50 grams of a PO-EO-PO block copolymer having an average of about 18 moles PO, 14 moles EO and 18 moles PO, and 50 grams of a benzyl ether of a $C_{10-14}$ linear alcohol (12.4) mole ethoxylate. The tank agitator was energized and warmed to 195° F. About 20 parts by weight of water were added and the surfactant mixture was warmed until the tank reached 195° F. Into the stirred tank was added about 60 grams of a nonionic comprising a benzyl capped $C_{10-14}$ linear alcohol 12 mole ethoxylate. Into the stirred surfactant blend was added 175 grams of sodium carbonate (anhydrous). The organic inorganic mixture was agitated until uniform and heated to a portable viscosity (approximately 142° F. After uniformity was achieved, about 165 grams of sodium tripolyphosphate were added to the stirred blend. The viscosity was monitored and held between 6,000 and 20,000 cP at about 150° F. The stirred blend was cast into 8 pound solid blocks for use in the warewashing experimentation shown below.

The detergent compositions shown above were tested and compared to commercial Ecolab® Solid Ultraclean Plus solid detergent compositions free of a rinse agent used in a wash cycle with a solid ultra dry composition in a rinse cycle, if needed. Such detergent compositions could contain some small amount of nonionic defoamer or nonionic detergent to enhance soil removal properties. The results of the experiments using the detergents of the invention when compared to detergents free of the rinse agent are shown below.

In this experiment we used a low temperature machine, city water at 130° F., 1200 ppm solid detergent and 1000 ppm load soil in a 20 cycle test. The lab soil used is a 50/50 combination of beef stew and Hot Point soil. The Hot Point soil is a greasy, hydrophobic soil made of 4 parts Blue Bonnet all vegetable margarine and 1 part Carnation Instant Non-Fat milk powder.

We want to see the effect when the product is carried over on the glasses only. To do this use the product as usual in the wash. But after the water drains from the wash, remove the glasses, leave the rack in the machine. Then go through the rest rinse cycle and the following wash cycle using water only—no product. The objective is to wash as much of the residual product as possible from the rack and the machine. After the water drains from the wash cycle, but before the fill, put the glasses back in the rack and go through the rinse. That is a complete cycle. Based on rough titration measurements about 5.2–5.6% of the wash water carried over into the rinse water.

SPOT AND FILM TEST/20 CYCLES LOW TEMP.
MACHINE ES-2000/CITY WATER AT 130 F. 1000 PPM FOOD SOIL

| | STP/Ash Only | STP/Ash Surfactants | Example I | Example I | Commercial Ecolab Detergent | Commercial Ecolab Detergent and Rinse Aid |
|---|---|---|---|---|---|---|
| FILM | | | | | | |
| Tomato | 1.17 | 1.50 | 1.00 | 2.00 | 1.50 | 1.50 |
| Milk | 1.00 | 1.58 | 2.00 | 1.50 | 1.33 | 1.00 |
| No Soil | 2.50 | 2.00 | 3.00 | 2.33 | 1.58 | 1.00 |
| Avg. | 1.56 | 1.69 | 2.00 | 1.94 | 1.47 | 1.17 |

-continued

SPOT AND FILM TEST/20 CYCLES LOW TEMP. MACHINE ES-2000/CITY WATER AT 130 F. 1000 PPM FOOD SOIL

| | STP/Ash Only | STP/Ash Surfactants | Example I | Example I | Commercial Ecolab Detergent | Commercial Ecolab Detergent and Rinse Aid |
|---|---|---|---|---|---|---|
| SPOT | | | | | | |
| Tomato | 1.17 | 2.17 | 1.00 | 1.67 | 2.67 | 2.17 |
| Milk | 2.67 | 2.50 | 1.25 | 1.83 | 3.00 | 1.17 |
| No Soil | 3.50 | 3.83 | 1.50 | 1.50 | 4.83 | 1.58 |
| Avg. | 2.83 | 2.83 | 1.25 | 1.67 | 3.50 | 1.64 |
| STREAKS | | | | | | |
| Tomato | 1.00 | 1.00 | 3.00 | 1.83 | 1.50 | 2.17 |
| Miik | 1.00 | 1.33 | 2.50 | 1.50 | 1.67 | 1.83 |
| No Soil | 1.00 | 1.00 | 3.00 | 1.50 | 1.05 | 2.83 |
| Avg. | 1.00 | 1.33 | 2.83 | 1.61 | 1.41 | 2.28 |

*The glasses were taken out between cycle

SPOT AND FILM TEST/20 CYCLES LOW TEMP. MACHINE ES - 2000/CITY AT 130 F. 1000 PPM FOOD SOIL

| Test # | Soil detergent/ rinse | STP/Ash[1] 2.3/2.1 gm Wash Cycle | Sur-factants 0.20 gm in Rinse Cycle | Example I 1200 ppm ppm Wash Cycle | Film | Spots & Streaks |
|---|---|---|---|---|---|---|
| 1 | Tomato | | | X | No | 3.0 streaks |
| | Milk | | | X | 1.0 | 2.5 |
| | No Soil | | | X | 2.5 | 3.0 |
| 2 | Tomato | X | | | No | 2.0 spots |
| | Milk | X | | | 1.0 | 4.0 spots |
| | No Soil | X | | | 3.0 | 5.0 spots |
| 3 | Tomato | X | X | | 1.0 | 3.0 spots |
| | Milk | X | X | | 1.0 | 3.0 spots |
| | No Soil | X | X | | 3.0 | 5.0 spots |
| 4 | Tomato | | | X | 2.0 | 2.0 spots |
| | Milk | | | X | 1.0 | 3.0 spots |
| | No Soil | | | X | 3.5 | 3.0 spots |

Test No. 4: The glasses were taken out between the cycle.
[1]Sodium tripolyphosphate/sodium carbonate detergent.

The above experimental data demonstrates that the method of the invention obtains substantially equivalent rinsing using a rinse aid that is carried over from the wash cycle.

EXAMPLE 2

In a second test sequence, a "typical" set of conditions were run in a low temperature dishmachine to compare a standard detergent and rinse aid (Ecolab Solid Ultra Klene Plus and Solid Ultra Dry) versus the test detergent/rinse aid combination formula.

In test 1, a standard detergent and rinse aid 1100 ppm of Slid Ultra Klene Plus and 6 grams of Solid Rinse Additive were run through a 10 cycle spot and film test. In test 2, 1160 ppm of the test detergent shown below run with no rinse additive and the results after 10 cycles were at least as good as those observed with test 1. Furthermore, a third test was run where Solid Ultra Klene Plus was run with the rinse additive reduced to 0.7 grams per rack. This test was stopped after 8 cycles, due to the glassware being severely spotted and filmed.

In conclusion, a "standard" detergent needs to be run with a rinse additive in order to get acceptable results, while the test detergent formula gave very good results without the addition of a separate rinse additive.

All tests were run in the solid low temp machine (1.7 gallons of water) in city water Total soil (2000 ppm) was 6.4 grams (4.24 grams beef stew+2.16 grams hot point soil).

Machine holds 1.7 gallons of water, 3 glasses were soiled with milk and 3 with tomato juice.

Test detergent formula prepared as shown by directly adding the material to the dishmachine.

| Component | | Grams |
|---|---|---|
| Sodium tripolyphoshate | 33 | 165 |
| $(EO)_{18}$—$(PO)_{14}$—$(EO)_{18}$ | 10 | 50 |
| Benzyl capped $C_{10-14}$ linear alcohol (12 mole) ethoxylate | 12 | 50 |
| $(PO)_{23}$—$EO)_{26}$—$PO)_{40}$ —$(EO)_{20}$—$EO)_{26}$—$PO)_{23}$ | 10 | 60 |
| $Na_2CO_3$Carbonate | 35 | 175 |

| | Cycle | Titr | Note: 10 drops = 1100 ppm detergent |
|---|---|---|---|
| | | | TEST 1 |
| Standard | 1 | 8 | rinse aid consumption averaged 6 grams per cycle |
| chemical | 2 | 10 | |
| detergent | 3 | 10 | |
| rinse aid | 4 | 7 | |
| | 5 | 11 | |
| | 6 | 10 | |
| | 7 | 9 | |
| | 8 | 7 | |
| | 9 | | |
| | 10 | 11 | |
| Results: | The glasses looked good at the end of 10 machine cycles. | | |
| | | | TEST 2 |
| Test detergent with no rinse aid | 1 | 4 | 1160 ppm detergent per cycle note: no foam or odor in machine |
| | 2 | 4 | |
| | 3 | 4 | |
| | 4 | 4 | |
| | 5 | 4 | |
| | 6 | 4 | |
| | 7 | 4 | |
| | 8 | 4 | |
| | 9 | 4 | |
| | 10 | 4 | |
| Results: | Glasses looked as good and even better than standard Test 1 | | |

-continued

| TEST 3 | | | |
|---|---|---|---|
| Standard detergent rinse aid | 1 | 9 | Note: rinse aid averaged at 0.7 grams |
| | 2 | 9 | |
| | 3 | 8 | |
| | 4 | 10 | |
| | 5 | 8 | |
| | 6 | 9 | |
| | 7 | 9 | |
| | 8 | 9 | |
| Results: | | Glasses looked so bad test was stopped. | |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of washing ware, using a cleaning composition containing a nonionic rinse agent composition to both wash and rinse, the method comprising:

(a) contacting ware with an aqueous cleaning composition, in an automatic warewashing machine, the aqueous cleaning composition comprising a major proportion of an aqueous diluent and about 250 to 3000 parts by weight of an alkaline warewashing detergent per each one million parts of the aqueous diluent, the detergent comprising:

(i) about 0.1 to 60 wt-% of a source of alkalinity;

(ii) at least about 30 wt-% of nonionic surfactant having at least one block segment comprising $-(AO)_x-$;

wherein AO represents an oxyalkylene moiety and x is a number of about 1 to 100; and (b) contacting the washed ware with a potable aqueous rinse, the aqueous rinse being substantially free of an intentionally added rinse agent, to remove an aqueous residue;

wherein the alkaline warewashing detergent contains sufficient nonionic surfactant to provide adequate sheeting action in the potable aqueous rinse.

2. The method of claim 1 wherein the potable aqueous rinse is recycled and combined with the warewashing detergent to form the aqueous cleaning composition.

3. The method of claim 1 wherein the aqueous cleaning composition comprises about 800 to 1800 parts of the alkaline detergent per each million parts of aqueous diluent.

4. The method of claim 3 wherein the potable aqueous rinse, after it is used, is directed to a machine discharge and the aqueous cleaning composition, after use, is directed to a machine discharge.

5. The method of claim 1 wherein the temperature of the aqueous cleaning composition is about 30° C. to 65° C.

6. The method of claim 1 wherein the temperature of the aqueous cleaning composition is about 65° C. to 85° C.

7. The method of claim 1 wherein the temperature of the rinse is about 30° C. to 65° C.

8. The method of claim 1 wherein the source of alkalinity is sodium hydroxide present at a concentration of about 0.1 to 35 wt-%.

9. The method of claim 1 wherein the source of alkalinity is $Na_2CO_3$ present at a concentration of about 5 to 50 wt %.

10. The composition of claim 1 wherein the nonionic surfactant comprises a block polymeric surfactant.

11. The method of claim 1 wherein the nonionic surfactant comprises a alcohol ethoxylate comprising the formula segment:

$$C_{6-24}\text{Alkyl-O-(EO)}_x\text{-}$$

wherein EO is an oxyethylene moiety and x is 1–100.

12. The method of claim 1 wherein the nonionic surfactant comprises a benzyl capped alcohol ethoxylate comprising the formula:

$$C_{6-24}\text{Alkyl-O-(EO)}_x\text{-Bz}$$

wherein EO is an oxyethylene moiety, Bz is benzyl and x is 2–25.

13. The method of claim 1 wherein the nonionic surfactant comprises a nonionic block polymeric surfactant having the formula:

$$\text{HO-(PO)hd y-(EO)}_x\text{-(PO)}_y\text{-H}$$

wherein PO is oxypropylene, EO is oxyethylene, x and y are independently 1–100.

14. The method of claim 1 wherein the nonionic surfactant comprises a nonionic block polymeric surfactant having the formula:

$$\text{HO-(PO)}_y\text{-(EO)}_x\text{-(PO)}_z\text{-(EO)}_x\text{-(PO)}_y\text{-H}$$

wherein PO is oxypropylene, EO is oxyethylene and x, y and z are independently about 1–100.

15. The method of claim 14 wherein the $(PO)_z$ moiety comprises a heteric block comprising a propylene glycol residue, about 1–5 moles EO and about 20–30 moles PO.

16. The method of claim 1 wherein the warewashing detergent is a solid detergent formed in a capsule comprising a thermoplastic.

17. The method of claim 16 wherein the weight of the solid detergent is about 0.25 to 10 kilograms.

18. A method of washing ware using a cleaning composition using a solid block nonionic composition to both wash and rinse, the method comprising:

(a) contacting ware with aqueous cleaning composition in an automatic warewashing machine, the aqueous cleaning composition comprising a major proportion of water and an alkaline warewashing detergent comprising:

(i) about 1 to 60 wt-% of an alkali metal carbonate or bicarbonate;

(ii) at least about 30 wt-% of a first block polymer nonionic surfactant having at least one block segment comprising:

an $-(EO)_x-$ segment, a $-(PO)_y$-segment or both;

wherein EO represents an oxyethylene moiety and PO represents an oxypropylene moiety, x and y are integers of 1–100; and wherein the solid block nonionic composition is substantially free of both an alkali metal hydroxide and an alkali metal silicate and each weight percent is based on the solid block nonionic composition; and (b) contacting the washed ware with a potable aqueous rinse, the rinse being substantially free of an intentionally added rinse agent to remove any resinable residue; wherein the alkaline warewashing detergent contains sufficient nonionic surfactant to provide adequate sheeting action in the potable aqueous rinse.

19. The method of claim 18 wherein the alkali metal carbonate is sodium carbonate present at a concentration of about 5 to 50 wt-%.

20. The method of claim 18 wherein the warewashing detergent comprises a second nonionic surfactant comprising a benzyl capped alcohol ethoxylate of the formula:

$$C_{6\text{-}24}\text{Alkyl-O-(EO)}_x\text{-Bz}$$

wherein EO is an oxyethylene moiety, Bz is benzyl and x is 1–100.

21. The method of claim 18 wherein the nonionic surfactant is of the formula:

$$\text{HO-(PO)hd y-(EO)}_x\text{-(PO)}_y\text{-H}$$

wherein PO is oxypropylene, EO is oxyethylene, x and y are independently 1–100.

22. The method of claim 18 wherein the nonionic surfactant comprises a nonionic block polymeric surfactant having the formula:

$$\text{HO-(PO)}_y\text{-(EO)}_x\text{-(PO)}_z\text{-(EO)}_x\text{-(PO)}_y\text{-H}$$

wherein PO is oxypropylene, EO is oxyethylene and x, y and z are independently about 1–100.

23. The method of claim 22 wherein the $(PO)_z$ moiety comprises a heteric block comprising a propylene glycol residue, about 1–5 moles EO and about 20–30 moles PO.

24. The method of claim 18 wherein the solid block nonionic composition is formed in a capsule comprising a thermoplastic.

25. The method of claim 18 wherein the weight of the solid block nonionic composition is about 0.25–10 kilograms.

26. The method of claim 25 wherein the composition comprises about 0.1 to 30 wt-% of a urea solidification agent.

*27. A method of washing ware, using a cleaning composition containing a rinse agent, the method comprising steps of:*

(*a*) *washing ware with an aqueous cleaning composition, in an automatic warewashing machine, the aqueous cleaning composition comprising a major proportion of an aqueous diluent and a sufficient amount of an alkaline warewashing detergent to adequately clean the ware while leaving a sufficient concentration of a rinse agent residue on the ware, the detergent comprising:*

(*i*) *about 0.1 to 60 wt-% of a source of alkalinity;*

(*ii*) *rinse agent, comprising a nonionic material, in an amount sufficient to provide an aqueous residue on the ware as a result of the step of washing that contains sufficient rinse agent to provide sheeting action when the ware is rinsed with a potable aqueous rinse; and*

(*b*) *rinsing the washed ware with a potable aqueous rinse, the potable aqueous rinse being substantially free of an intentionally added rinse agent, to remove an aqueous residue.*

*28. The method of claim 27 wherein the potable aqueous rinse is recycled and combined with the warewashing detergent to form the aqueous cleaning composition.*

*29. The method of claim 27 wherein the aqueous cleaning composition comprises about 800 to 1800 parts of the alkaline detergent per each million parts of aqueous diluent.*

*30. The method of claim 29 wherein the potable aqueous rinse, after it is used, is directed to a machine discharge and the aqueous cleaning composition, after use, is directed to a machine discharge.*

*31. The method of claim 27 wherein the temperature of the aqueous cleaning composition is about 30° C. to 65° C.*

*32. The method of claim 27 wherein the temperature of the aqueous cleaning composition is about 65° C. to 85° C.*

*33. The method of claim 27 wherein the temperature of the rinse is about 30° C. to 65° C.*

*34. The method of claim 27 wherein the source of alkalinity is sodium hydroxide present at a concentration of about 0.1 to 35 wt-%.*

*35. The method of claim 27 wherein the source of alkalinity is $Na_2CO_3$ present at a concentration of about 5 to 50 wt %.*

*36. The method of claim 27, wherein the rinse agent comprises a nonionic surfactant having at least one block segment comprising*

$$\text{-}(AO)_x\text{-}$$

*wherein AO represents an oxyalkylene moiety and x is a number of about 1 to 100.*

*37. The composition of claim 27, wherein the rinse agent comprises at least one of polyoxyethylene (ethoxylate) surfactants, carboxylic acid ester surfactants, carboxylic acid amide surfactants, hydrophobically substituted oxyalkylene surfactants, and polyalkylene oxide block copolymers.*

*38. The method of claim 36 wherein the nonionic surfactant comprises an alcohol ethoxylate comprising the formula segment:*

$$C_{6\text{-}24}Alkyl\text{-}O\text{-}(EO)_x\text{-}$$

*wherein EO is an oxyethylene moiety and x is 1–100.*

*39. The method of claim 36 wherein the nonionic surfactant comprises a benzyl capped alcohol ethoxylate comprising the formula:*

$$C_{6\text{-}24}Alkyl\text{-}O\text{-}(EO)_x\text{-}Bz$$

*wherein EO is an oxyethylene moiety, Bz is benzyl and x is 2–25.*

*40. The method of claim 36 wherein the nonionic surfactant comprises a nonionic block polymeric surfactant having the formula:*

$$HO\text{-}(PO)_y\text{-}(EO)_x\text{-}(PO)_y\text{-}H$$

*wherein PO is oxypropylene, EO is oxyethylene, x and y are independently 1–100.*

*41. The method of claim 36 wherein the nonionic surfactant comprises a nonionic block polymeric surfactant having the formula:*

$$HO\text{-}(PO)_y\text{-}(EO)_x\text{-}(PO)_z\text{-}(EO)_x\text{-}(PO)_y\text{-}H$$

*wherein PO is oxypropylene, EO is oxyethylene and x, y and z are independently about 1–100.*

*42. The method of claim 41 wherein the $(PO)_z$ moiety comprises a heteric block comprising a propylene glycol residue, about 1–5 moles EO and about 20–30 moles PO.*

*43. The method of claim 41 wherein the warewashing detergent is a solid detergent formed in a capsule comprising a thermoplastic.*

*44. The method of claim 43 wherein the weight of the solid detergent is about 0.25 to 10 kilograms.*

* * * * *